United States Patent
Perumal et al.

(10) Patent No.: US 11,911,822 B2
(45) Date of Patent: Feb. 27, 2024

(54) MULTI-LAYER COMPOSITES WITH VARIED LAYER THICKNESSES AND RELATED METHODS

(71) Applicant: ENTEGRIS, INC., Billerica, MA (US)

(72) Inventors: Thines Kumar Perumal, Singapore (SG); Subhash Guddati, Singapore (SG); Montray Leavy, Singapore (SG); Virendra Warke, North Chelmsford, MA (US); Devon N. Dion, Nashua, NH (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/541,690

(22) Filed: Dec. 3, 2021

(65) Prior Publication Data
US 2022/0184703 A1     Jun. 16, 2022

Related U.S. Application Data

(60) Provisional application No. 63/125,296, filed on Dec. 14, 2020.

(51) Int. Cl.
*B22F 10/16*     (2021.01)
*B33Y 10/00*     (2015.01)
(Continued)

(52) U.S. Cl.
CPC .............. *B22F 10/16* (2021.01); *B22F 10/28* (2021.01); *B33Y 10/00* (2014.12); *B33Y 70/10* (2020.01); *B33Y 80/00* (2014.12)

(58) Field of Classification Search
CPC .......... B22F 10/00; B22F 10/10; B22F 10/14; B22F 10/16; B33Y 10/00; B33Y 70/00; B33Y 70/10; B33Y 80/00
See application file for complete search history.

(56) References Cited

U.S. PATENT DOCUMENTS

2014/0322501 A1* 10/2014 Ederer .................. B29C 64/165
                                                                                    428/206
2015/0352639 A1    12/2015 Toyserkani
(Continued)

FOREIGN PATENT DOCUMENTS

JP          2987893 B2 * 12/1999
JP       2003129111 A  *  5/2003
(Continued)

OTHER PUBLICATIONS

Poprawe et al., Chapter 5, SLM Production Systems: Recent Developments in Process Development, Machine Concepts and Component Design, Advances in Production Technology, Nov. 2015, pp. 49-65.

*Primary Examiner* — Anthony M Liang
*Assistant Examiner* — Danny N Kang (57) ABSTRACT

Three-dimensional multi-layer composite structures prepared by additive manufacturing techniques, as well as methods of preparing the structures by additive manufacturing techniques, wherein a multi-layer structure has layers of at least two different thicknesses and a precision thickness are disclosed herein. In some embodiments, a method includes forming a coarse feedstock layer having a coarse feedstock layer thickness, solidifying a portion of the coarse feedstock layer to form a solidified coarse feedstock layer having a solidified coarse feedstock layer thickness, before or after forming the solidified coarse feedstock layer, forming at least one fine feedstock layer having a fine feedstock layer thickness that is less than the coarse feedstock layer thickness, and solidifying a portion of the at least one fine feedstock layer to form the at least one solidified fine feedstock layer having a solidified fine feedstock layer thickness that is less than the solidified coarse feedstock layer thickness.

19 Claims, 6 Drawing Sheets

(51) Int. Cl.
  *B33Y 70/10* (2020.01)
  *B22F 10/28* (2021.01)
  *B33Y 80/00* (2015.01)

(56) References Cited

U.S. PATENT DOCUMENTS

| | | | |
|---|---|---|---|
| 2017/0021558 A1* | 1/2017 | Miyashita | B33Y 10/00 |
| 2018/0214955 A1* | 8/2018 | Kottilingam | B22F 10/34 |
| 2019/0054651 A1 | 2/2019 | Abbott, Jr. | |
| 2020/0338819 A1* | 10/2020 | Hinch | B33Y 70/00 |

FOREIGN PATENT DOCUMENTS

| | | |
|---|---|---|
| JP | 2003129111 A | 5/2003 |
| WO | 2019228278 A1 | 12/2019 |

* cited by examiner

MULTI-LAYER COMPOSITES WITH VARIED LAYER THICKNESSES AND RELATED METHODS

This application claims the benefit under 35 USC 119 of U.S. Provisional Patent Application No. 63/125,296, filed Dec. 14, 2020, the disclosure of which is hereby incorporated herein by reference in its entirety.

FIELD

The described invention relates to three-dimensional multi-layer composite structures that are prepared by additive manufacturing techniques, as well as methods of preparing the structures by additive manufacturing techniques, wherein a multi-layer structure has layers of at least two different thicknesses and a precision thickness.

BACKGROUND

Rigid bodies made of metal or ceramic, one example type being porous sintered metal bodies or membranes, find uses in a variety of industrial applications. Porous metal membranes may be used as filter membranes in the microelectronics and semiconductor manufacturing industries, as well as other industries that require highly pure raw materials for processing. For example, in the semiconductor and microelectronics industries, in-line filters are often used to remove particulate matter from fluids to prevent introduction of the particulate matter into a manufacturing process. The fluid may be in the form of a gas or a liquid.

Currently, common methods of preparing porous sintered metal bodies commercially include forming and sintering steps that involve manually moving and handling intermediate (in-process) forms of a porous body. These steps are labor intensive. Moreover, the bodies are fragile and the forming steps can be imprecise. These features cause the methods to be prone to substantial waste, undesirably low efficiencies, and undesirably high costs. Moreover, many rigid bodies must be formed to a highly precise shape or size (e.g., thickness). Sometimes a metal body may be formed in an initial stage and then processed by a machining step to achieve necessary precision of a shape or a size feature. A machining step, however, adds expense and complexity when preparing any type of rigid body. Additionally, some types of metal bodies are negatively impacted by a machining step, e.g., a machining step may clog pores of a porous membrane.

SUMMARY

The following description relates to additive manufacturing methods that are effective in producing a multi-layer composite that exhibits a high degree of precision in at least one dimension, such as in a thickness direction ("z-direction").

Methods as described use additive manufacturing techniques to form multi-layer bodies (i.e., "multi-layer composites") by steps that include forming layers of different thicknesses, to achieve a desired level of precision or "thickness tolerance" with respect to the thickness of the body. Thicknesses of the layers are selected to produce a multi-layer composite that has a measured thickness that is equal to a target thickness, within a thickness tolerance range. If a thickness tolerance is 0.1 millimeter (denoted: +/−0.1 mm), an acceptable multi-layer composite may have a measured thickness that is not more than 0.1 millimeter greater than the target thickness, and that is not more than 0.1 millimeter less than the target thickness.

By forming at least some of the layers of the multi-layer composite to have a thickness that is less than the magnitude of the thickness tolerance, the measured thickness can be controlled to a degree that is within the thickness tolerance, relative to the target thickness. In example methods, a method may include forming one or more layers that have a thickness that is less than a magnitude of a thickness tolerance. Other layers can be formed to have a thickness that is greater than the magnitude of the thickness tolerance.

Thus, to prepare a multi-layer composite by an additive manufacturing method as described, with the composite having an actual (measured) thickness that is within a pre-determined thickness tolerance of a target thickness, the method includes forming multiple layers by the additive manufacturing method, with the multiple layers having at least two different thicknesses, e.g., one or more "fine" layers that have relatively lower thicknesses, and one or more coarse layers having relatively greater thicknesses.

The combination of coarse layers and fine layers produces a combination of precision thickness and manufacturing efficiency. The coarse layers that are formed at greater thicknesses will improve manufacturing efficiency by reducing the number of layers that must be formed to produce a multi-layer composite of a particular thickness. The fine layers can be used to control the thickness of the composite to a desired tolerance.

The multi-layer composite that is formed by the additive manufacturing steps can be of any size, shape, and purpose, and particularly may be a structure that is formed to a desirably high level of dimensional precision. In example methods the multi-layer composite is a green body that is a precursor to a derivative structure that has a desired utility. The green body may be processed after being formed to produce a derivative structure, such as a rigid inorganic body, for example a porous metal membrane. By forming the green body to exhibit a precise thickness dimension, the derivative structure (e.g., metal membrane) will also have a precise thickness.

In one aspect, the invention relate to methods of forming a three-dimensional body by additive manufacturing steps. A method includes: forming a coarse feedstock layer having a coarse feedstock layer thickness, solidifying a portion of the coarse feedstock layer to form a solidified coarse feedstock layer having a solidified coarse feedstock layer thickness, before or after forming the solidified coarse feedstock layer, forming a fine feedstock layer having a fine feedstock layer thickness that is less than the coarse feedstock layer thickness, solidifying a portion of the fine feedstock layer to form a solidified fine feedstock layer having a solidified fine feedstock layer thickness that is less than the solidified coarse feedstock layer thickness.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

The following description relates to methods that are useful for preparing multi-layer three-dimensional structures by additive manufacturing methods, including methods that are commonly referred to as "3-D printing" techniques.

Different versions of additive manufacturing techniques are known. These methods, as applied to the present description, generally involve a series of layer-formation steps that individually and sequentially form multiple layers (e.g., "paths") of solidified feedstock composition that contains particles dispersed in solidified binder composition. The solidified binder composition acts as a structure that holds the particles together within the solidified feedstock composition. Using a series of additive manufacturing steps, the multiple layers of solidified feedstock are sequentially formed into a multi-layer composite that includes the multiple layers of the solidified feedstock composition.

Specific examples of additive manufacturing techniques include those that are commonly referred to as "powder-bed" additive manufacturing methods, which include various "binder jet printing" techniques, and also those techniques referred to as stereolithography techniques (SLA). Methods and materials that are described herein may be useful with these types of additive manufacturing methods, and are described in terms of these exemplary techniques.

According to the present description, additive manufacturing techniques may be used to prepare a three-dimensional body that has a thickness (i.e., a "measured thickness" or an "actual thickness") with a desired level of precision. As described, a body can have a thickness that is within a thickness tolerance range of a target thickness.

In manufacturing, a structure (or "part") that is prepared by a manufacturing process must often meet desired size and shape requirements, including dimension requirements such as a thickness requirement. A thickness requirement can be described using two factors: one factor is a nominal thickness, referred to as a "target thickness," which is a specific thickness dimension desired. A second factor is a "thickness tolerance," which is a range of maximum acceptable deviation of an actual (measured) thickness, from the target thickness, either greater than or below the target thickness. A thickness tolerance is identified as a value having a unit of length, following a "plus" ("+") designation, a "minus" ("−") designation, or a "plus-minus" ("+/−") designation to indicate whether the tolerance allows for deviation from the target thickness in a direction that is greater than, less than, or either greater than or less than the value of the target thickness, respectively. A tolerance of +/−0.1 millimeter allows for a difference of up to 0.1 millimeter greater than a target thickness, and of up to 0.1 millimeter less than the target thickness. A tolerance of +0.1 millimeter allows for a difference of up to 0.1 millimeter greater than a target thickness but does not allow for a difference that is less than the target thickness. Similarly, a tolerance of −0.1 millimeter allows for a difference of up to 0.1 millimeter less than a target thickness but does not allow for a difference that is greater than the target thickness.

The "magnitude" of the thickness tolerance is the numerical value of the tolerance. For a thickness tolerance of +/−0.1 mm, the magnitude of the thickness tolerance is 0.1 mm. The "range" of the thickness tolerance is either equal to the magnitude or twice the magnitude. The range of thicknesses allowed by a thickness tolerance of +/−0.1 mm is between a thickness that is 0.1 mm less than the target thickness, and a thickness that is equal to 0.1 mm more than the target thickness, which spans a total of 0.2 mm. The range of thicknesses allowed by a thickness tolerance of +0.1 mm is between the target thickness and a thickness that is 0.1 mm greater than the target thickness, and is equal to 0.1 mm.

A structure as described may be of a type that is produced according to a pre-selected target thickness and thickness tolerance. Additive manufacturing methods are capable of producing structures that have a wide range of dimensions, including thicknesses. A multi-layer composite that is prepared according to the present description may have a thickness in a range of microns, e.g., less than 100 microns; to a range of a fraction of inches, e.g., 0.25 inch, 0.5 inch; or in a range of inches, e.g., 1, 2, or more inches.

As an example for purposes of illustration, a manufacturing process may be designed to produce a part that has an intended thickness in a range of a fraction of an inch, such as of one-tenth of an inch, or 2.54 millimeters. This intended (desired) thickness is referred to as a "target thickness" and can be pre-selected for manufacturing a part. Along with the pre-selected target thickness, a manufacturing process may also pre-select a "thickness tolerance," which defines a range of acceptable thicknesses above and below the pre-selected target thickness value.

According to this example, an acceptable part may be considered to be a part that has a thickness that is either greater than or below the target thickness by not more than the magnitude of the thickness tolerance; an acceptable part has a thickness that differs from the target thickness by not more than the magnitude of the thickness tolerance. For a part with a target thickness of 2.54 millimeters and a tolerance of 0.1 millimeter (denoted: +/−0.1 mm), an acceptable part may have a thickness in a range from 2.44 to 2.64 millimeters. For a part with a target thickness of 2.54 millimeters and a tolerance of 0.05 millimeter (denoted: +/−0.05 mm), an acceptable part may have a thickness in a range from 2.49 to 2.59 millimeters.

The methods of the present description use additive manufacturing techniques to form multi-layer bodies (i.e., "multi-layer composites") by steps that include forming multiple layers of the multi-layer body, with different layers having different thicknesses, to achieve a desired precision with respect to the thickness of the body (to form a body having a thickness that is within a pre-determined thickness tolerance relative to a target thickness). Thicknesses of the layers are selected to produce a completed multi-layer composite that has a measured thickness that is equal to a target thickness, within a thickness tolerance range. If a thickness tolerance is 0.05 millimeter (denoted: +/−0.05 mm), an acceptable multi-layer composite may have a measured thickness that is not more than 0.05 millimeter greater than the target thickness, and that is not more than 0.05 millimeter less than the target thickness.

By forming at least some of the layers of the multi-layer composite to have a thickness that is less than the magnitude of the thickness tolerance, the measured thickness can be controlled to a degree of precision that allows the measured thickness of the multi-layer composite to be within the thickness tolerance, relative to the target thickness. In example methods, a method may include forming one or more layers that have a thickness that is less than a magnitude of a thickness tolerance. Other layers can be formed to have a thickness that is greater than the magnitude of the thickness tolerance.

Thus, to prepare a multi-layer composite by an additive manufacturing method as described, with the composite having an actual (measured) thickness that is within a pre-determined thickness tolerance of a target thickness, the method includes forming multiple layers by the additive manufacturing method, with the multiple layers having at least two different thicknesses. For purposes of the present description, these layers will be referred to as: a fine layer, referring to a layer having a lower thickness; and a coarse layer, referring to a layer having a greater thickness.

Forming multiple fine layers having lower thicknesses during an additive manufacturing process will reduce the rate of production of a multi-layer composite, i.e., will increase the number of steps and the amount of time required to produce a multi-layer composite that has a particular thickness, because a higher number of the fine (thinner) layers must be formed, meaning that a higher number of additive manufacturing steps is required to build a multi-layer composite of a given thickness. However, forming the composite with one or more fine layers advantageously allows for control of the thickness of the multi-layer composite.

A thickness of a fine layer can be a thickness that is within a typical a range of thicknesses of layers formed by an additive manufacturing method, especially at a low end of the range, such as a thickness in a range from 30 microns to 100 microns, e.g., from 30 to 50, 60, 70, 80, or 90 microns. The thickness of a fine layer can also be selected based on the value of a thickness tolerance.

In example methods, a thickness of a fine layer can be less than a magnitude of a thickness tolerance. Using a fine layer having a thickness that is less than a magnitude of a thickness tolerance can produce a multi-layer composite to a level of precision that is approximately equal to the thickness of the fine layer. To achieve a precision of 0.1 millimeters, so as to form a body having a thickness within a thickness tolerance of +/−0.1 millimeters, a useful thickness of a fine layer may be 0.1 millimeter. In other example methods, a thickness of a fine layer may be a fraction of the magnitude of the thickness tolerance, e.g., three-quarters, one-half, one third, or one quarter of the magnitude of the thickness tolerance; i.e., for a thickness tolerance that is 0.1 millimeter, a fine layer may have a thickness of 0.075, 0.05, 0.033, or 0.025 mm to form a multi-layer composite having a thickness that is within 0.1 mm of a target thickness.

In combination with one or more fine layers, one or more coarse layers having a relatively greater thickness (compared to a fine layer) can be formed using an additive manufacturing method, to increase the rate of production of a multi-layer composite. Using layers of relatively greater thickness to form a multi-layer composite will increase a rate of production (reduce the amount of time needed) to prepare the multi-layer composite, because the increased thicknesses of the layers will reduce the total number of layers needed, and the number of layer-forming steps needed, to produce a multi-layer composite of a particular thickness. A thickness of a coarse layer may be a thickness that is within a typical range of layers formed by an additive manufacturing method, e.g., in a range of from 100 microns to 500 microns. A greater thickness of a coarse layer will reduce a number of steps and an amount of time required to form a finished multi-layer composite of a pre-determined total thickness.

A multi-layer composite that is prepared according to a method as described can have multiple layers of different thicknesses, including multiple layers having a relatively greater thickness (referred to a "coarse" layers) and multiple layers having a relatively lower thickness (referred to as a "fine" layer). The position of one or more fine layers as part of a multi-layer composite, relative to coarse layers, may be any useful position. Likewise, an order in which one or more fine layers is formed relative to one or more coarse layers, can be any useful order. Various locations of the coarse layers and the fine layers, and various orders of forming the coarse layers and the fine layers, may be effective for a purpose of providing a multi-layer composite having a thickness that falls within a pre-determined thickness tolerance relative to pre-determined target thickness.

Figure 1A:
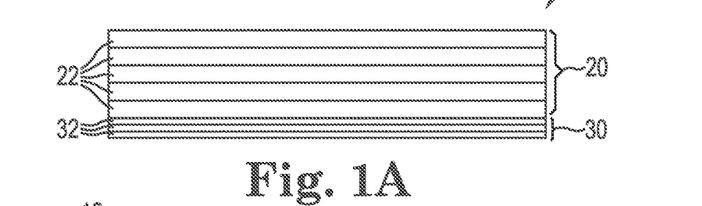
FIGS. 1A, 1B, 1C, 1D, and 1E show examples of multi-layer composites as described.

By one example, for purposes of illustration, a fine layer or a series (group) of fine layers (which may optionally all be formed to the same thickness) may be first formed at a "bottom" of a multi-layer composite. After forming one or a group of fine layers, one or a groups of coarse layer (which may optionally all be formed to the same thickness) may be formed after ("above") the one or more fine layers. FIG. 1A (schematic, and not to scale) shows an example of multi-layer composite 10 having a group 30 of three fine layers formed at a bottom of composite 10, and a subsequently formed group 20 of five coarse layers 22 formed after and above fine layers 32. As illustrated, a target thickness of composite 10 may be 600 microns (0.6 millimeters (mm)) with a tolerance of +/−50 microns (+−0.05 mm). Each coarse layer 22 may be formed to a thickness of 100 microns (0.1 mm), and each fine layer 32 may be formed to a thickness of 30 microns (0.03 mm). The total thickness of the combined fine and coarse layers is 590 microns (0.590 mm), which is within the thickness tolerance of +/−50 microns from the target thickness of 600 microns.

Figure 1B:
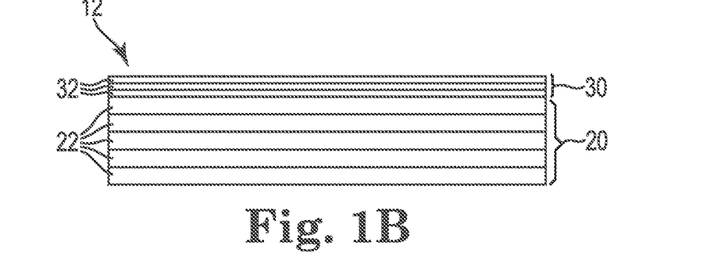

In other example methods, illustrated at FIG. 1B, a multi-layer composite 12 may be formed by first forming a group 20 of coarse layers 22, followed by forming a group 30 of fine layers 32. The coarse layers are formed first and are positioned in the multi-layer composite below the fine layers, at a bottom portion of the composite. Example thicknesses may be the same as in composite 12 of FIG. 1A, or may be different.

Figure 1C:
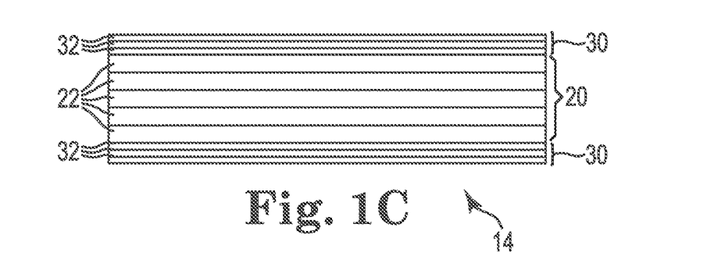

In a different example multi-layer composite, shown at FIG. 1C (also schematic, and not to scale), example multi-layer composite 14 includes a bottom group 30 of three fine layers 32 formed at a bottom of composite 14, a subsequently formed group 20 of five coarse layers 22 formed after and above fine layers 32, and a second group 30 of three fine layers 32 formed at a top of composite 14. In this embodiment, a group of fine layers 32 is present at each of the two exposed surfaces of composite 14 (e.g., as outer "skin" layers). Coarse layers 22 are located at interior positions of the composite (e.g., as "core" layers). As illustrated, a target thickness of composite 10 may be 700 microns (0.7 millimeters (mm)) with a tolerance of +/−50 microns (+−0.05 mm). Each coarse layer 22 may be formed to a thickness of 100 microns (0.1 mm) and each fine layer 32 may be formed to a thickness of 30 microns (0.03 mm). The total thickness of the combined fine and coarse layers is 680 microns (0.680 mm), which is within the thickness tolerance of +/−50 microns from the target thickness of 700 microns.

Figure 1D:
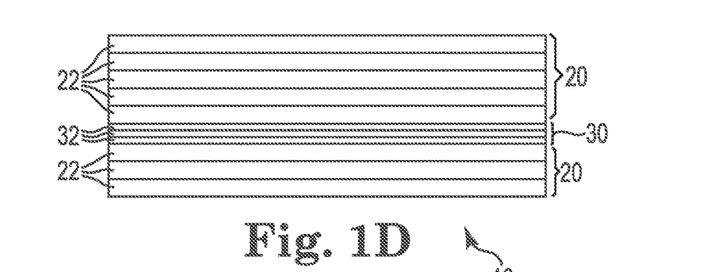

In still a different example multi-layer composite, shown at FIG. 1D (also schematic, and not to scale) example multi-layer composite 16 includes a bottom group 20 of three coarse layers 22 formed at a bottom of composite 16, a subsequently formed group 30 of three fine layers 32 formed after and above coarse layers 22, and a second group 20 of five coarse layers 22 formed at a top of composite 16.

Figure 1E:
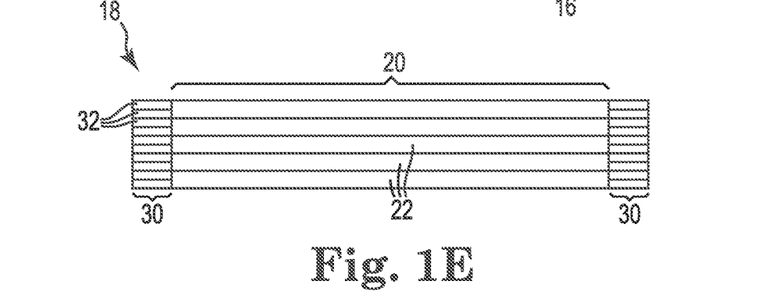

In another embodiment, shown for example in FIG. 1E (also schematic, and not to scale) example multi-layer composite 18 may include a first group 20 of coarse layers 22 forming a center of multi-layer composite 18 and a second group 30 of fine layers 32 forming an exterior side surface of the multi-layer composite 18.

As shown in FIGS. 1A-1E, fine layers 32 may form at least a portion of an exterior of multi-layer composite 10, 12, 14, 16, and 18. The embodiments shown in FIGS. 1A-1E can also be combined so that the fine layers 32 form an entire exterior of the multi-layer composite including the top surface, bottom surface and side surfaces. In some embodiments fine layers 32 may form a portion of, or the entirety of, the top surface, the bottom surface, and or the side surface(s). In some embodiments, when the fine layers 32 and the coarse layers 22 have a binder as discussed in more detail below, the binder saturation will be different between the fine layers 32 and the coarse layers 22. In embodiments, such as in FIG. 1E where there are fine layers forming an exterior side surface, the multi-layer composite may be formed by alternatingly depositing a first layer of powder to a thickness of the fine layer and depositing binder only on the area corresponding to the fine layer and then depositing a second layer of powder with binder being deposited for the entire second layer but there is a higher saturation rate of the binder for the area corresponding to the coarse layer 22 than the area corresponding to the fine layer 32. In some embodiments, as in FIG. 1E where the fine layers form an exterior surface there can be a gradient in the porosity and/or density from the exterior side surface inward.

As illustrated, any variety of arrangements of fine layers and coarse layers may be effective to produce a multi-layer composite that has a thickness within a pre-determined thickness tolerance relative to a target thickness.

A multi-layer composite directly formed by an additive manufacturing process as described generally is made of multiple separately-formed layers, each of which contains particles held together by the solidified binder composition. The multi-layer composite formed initially by the additive manufacturing steps may be any useful structure. In particular examples, a multi-layer composite may be a structure that is commonly be referred to as a "green body."

A multi-layer composite in the form of a green body contains particles dispersed throughout solidified binder material, which is a material that is useful during the additive manufacturing steps to form the multi-layer composite. In a typical method, a green body may not be a desired or functional end product but may instead be an intermediate product that must be further processed to form a useful derivative structure, which will be referred to herein as a "post-processed body."

A post-processed body can be of any structure, form, or composition that may be produced by an additive manufacturing technique that forms a green body and then subsequently processes the green body to form a derivative product (the post-processed body). Example post-processed bodies include rigid (e.g., self-supporting) bodies, e.g., rigid inorganic bodies made of a material that includes at least a portion of inorganic material such as a metallic material or a ceramic material, either of which originates from particles used to form a multi-layer composite in the form of a green body. A post-processed body that is prepared according to a method is prepared from a green body (multi-layer composite) that is formed to a precise thickness dimension, meaning a thickness that is within a particular tolerance range relative to a target thickness for the green body. Advantageously, a post-processed body that is prepared from the green body (having a precise thickness dimension) can also exhibit a precise thickness dimension, meaning a thickness that is within a particular tolerance range relative to a target thickness for the post-processed body.

In one particular example, a post-processed body may be a rigid inorganic body, for example a rigid inorganic body that is made from materials that include a metal, a metal alloy, or a ceramic. Examples of rigid organic bodies may be useful for various purposes, including some purposes for which a precise thickness of the rigid inorganic body can be useful or advantageous. These include porous inorganic (e.g., metal) membranes in the form of relatively thin, optionally flat structures having two opposed surfaces and a relatively even and precise thickness across the area of the membrane. The membrane may be in the form of a flat sheet, a disc, or another structure having a uniform thickness.

In more detail, a post-processed body in the form of a porous sintered metal body (membrane) for use as a filter (of any shape) may typically include two opposed major surfaces and a thickness between the two opposed major surfaces through which a fluid flows during use of the membrane as a filter in a filtering step. A thickness of example porous metal membranes used as a filter membrane (e.g., a thickness of a disk, sheet, or cup, or a thickness of a body wall of a tube or cylinder) can be in a range that is effective for use of the porous body as a filter membrane, e.g., that results in desired flow properties such as sufficient flow at a given pressure drop, and filtering properties such as particle retention, while having sufficient strength and structural integrity to be handled, installed, and used as part of a filter system. Examples of useful thicknesses (target thicknesses) may be in a range from 0.5 to 5 millimeters, e.g., from 1 to 4 millimeters. Example thickness tolerances for this type of post-processed body may be less than +/−0.1 mm; example thickness tolerances may be +/−0.09 mm or less, +/−0.08 mm or less +/−0.06 mm or less, or +/−0.05 mm or less.

Figure 2A:
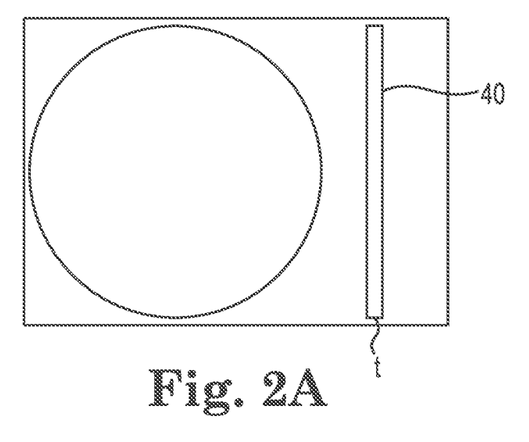
FIGS. 2A and 2B show examples of a post-processed body formed from a multi-layer composite as described.
Figure 2B:
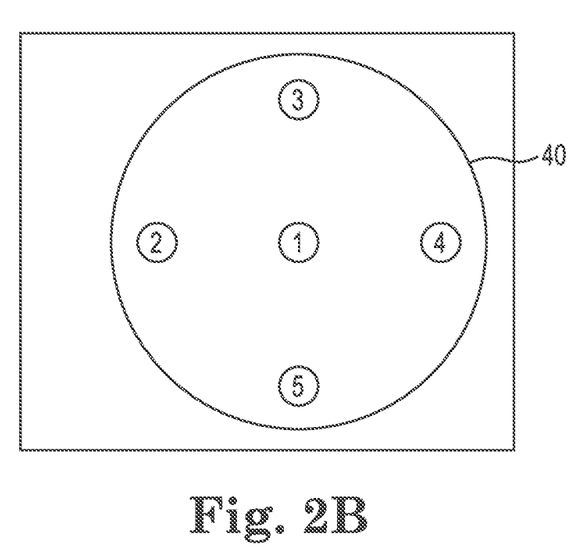

An example of a derivative body that may be prepared according to a method as described herein is shown at FIGS. 2A and 2B. Disk 40, illustrated as a porous sintered metal body (membrane), has a form that includes two opposed flat surfaces and a thickness (t) between the surfaces. The disk (e.g., porous sintered metal membrane) is made of sintered metal particles (e.g., of a metal or metal alloy, alternately ceramic), has a diameter, and is prepared according to a method of the present description to have a measured thickness that is within a desired (pre selected) thickness tolerance range relative to a target thickness.

In specific, disk 40 is a derivative body (post-processed body) formed by processing a green body in the form of a multi-layer composite formed by an additive manufacturing method as described. The green body is formed to exhibit a thickness that is within a thickness tolerance of a target thickness of the green body. The disk (post-processed body) can also have a precise thickness, meaning a thickness that is within a thickness tolerance of a target thickness of the post-processed body. To form the post-processed body to have a precise thickness within a tolerance of a target thickness, the green body is formed to a target thickness that is slightly greater than the target thickness of the post-processed body. During one or more post-processing steps, thickness of the green body will be slightly reduced. The thickness of the post-processed body will be slightly less than the thickness of the green body. By accounting for this reduction in thickness, the target thickness of the green body can be selected to be slightly greater than the target thickness of the post-processed body to account for the reduction in thickness that occurs during post-processing. The amount of the reduction in thickness caused by post-processing steps can be determined empirically. The thickness tolerance range for a post-processed body may be a range that is the equal to or approximately equal to the thickness tolerance range for the green body, and may be a thickness tolerance that is equal to any of the thickness tolerances described herein as useful for a multi-layer composite or a green body.

A "measured thickness" that is within a tolerance range of a target thickness can be measured as a thickness at a single location on a body (e.g., a multi-layer composite, e.g., green body, or a post-processed body), or, preferably, may be measured at multiple locations of a body. As shown at FIG. 2B, thickness of a post-processed body (e.g., porous sintered metal membrane) may be measured at multiple (e.g., five, identified as numerals 1 through 5) locations, such as at a center location and also at four locations spaced equidistantly about a perimeter. Preferably, a measured thickness of the body at multiple (e.g., five) measured locations is within a pre-selected thickness tolerance range relative to a target thickness, at all of the measurement locations.

Typically, to form a desired post-processed product from a multi-layer composite in the form of a green body, the green body, after formation, is further processed. The green body may be processed by one or more post-processing steps that include: a curing step to cure (e.g., crosslink) a binder composition using elevated temperature; a debind step to remove solidified binder; and a sintering step to cause particles of the composite to be fused together to form a sintered body.

In example methods, a debind step and a sintering step may be performed in a single apparatus (e.g., oven or furnace) or may be performed in a sequence of the debind step in a first apparatus, with a subsequent sintering step being performed in a second (different) apparatus. A temperature used for a debind step is lower than a temperature used for a sintering step. A temperature for a debinding step may normally be in a range below 600 degrees Celsius, for example in a range from 100 to 550 or 600 degrees Celsius. A temperature selected of any particular debind step, of a particular multi-layer composite, can depend on the chemistry of the binder. A temperature for a sintering step may be generally higher than a temperature for a debinding step, e.g., greater than 550 or 600 degrees Celsius.

The term "sintering" as used herein has a meaning that is consistent with the meaning that this term is given when used in the arts of porous sintered metal or ceramic structures. Consistent therewith, the term "sintering" can be used to refer to processes of bonding (e.g., "solid state welding" or "fusing") together a collection of small, sinterable particles of one or more different types (sizes, compositions, shapes, etc.) by applying heat to the particles as formed into a green body, in a non-oxidizing environment so that surfaces of the particles reach a temperature that causes the particle surfaces to become fused together by a physical (mechanical) bond between the particles surfaces, but that does not cause the particles to melt (i.e., none of the metal materials reaches its melting temperature).

A sintering step is performed at a temperature that is above the sintering point of particles of the body, but below the melting temperature of the particles. As used herein, a "sintering point" of a particle is a temperature at which the material of the particle is capable of being sintered, i.e., a temperature at which the particles begin adhering to other particles of the body being sintered, and can be fused to another particle, e.g., at a particular pressure such as at atmospheric pressure. A sintering point of a material (e.g., metal) is normally below a melting temperature of the material, meaning the temperature at which the material becomes liquid.

Thus, useful temperatures for performing a sintering and a debinding step can depend on the composition of the solidified binder for the debind step, and the composition of the particles and the sintering point of the particles, as well as the size of the particles being sintered, e.g., whether the particles are "coarse" (larger) or "fine" (smaller). A sintering step can be performed in a furnace or oven and in a non-oxidizing atmosphere that will not react with or otherwise detrimentally affect the particles of the body being sintered, e.g., in a vacuum or in an atmosphere of concentrated or pure hydrogen, concentrated or pure inert gas, or a combination of concentrated or pure hydrogen and inert gas.

For preparing a multi-layer composite as described, having a precise thickness relative to a pre-selected target thickness, certain types of additive manufacturing methods have been found to be useful or advantageous. Generally, additive manufacturing processes are known to be useful for preparing structures that exhibit a broad range of shapes and sizes. Additive manufacturing processes may also be highly automated and relatively efficient and cost-effective.

Additive manufacturing processes for forming a multi-layer composite require ingredients that include particles, e.g., inorganic particles such as metal particles, and one or more ingredients that combine to form a binder composition. The binder composition may be combined with the particles, and the binder composition may be solidified (hardened, cured, or the like) to produce a solidified feedstock composition that contains solidified binder composition acting as a physical support structure (matrix) for the particles. Steps of combining the particles with the binder composition and causing the binder composition to solidify as a layer of a composite may vary with different types of additive manufacturing techniques, e.g., steps of combining particles with binder composition may be different for powder-bed techniques, and for different versions of powder-bed techniques, compared to stereolithography techniques.

Particles useful according to the present description may be any particles that can be processed to form a useful multi-layer composite, a useful green body, or a useful post-processed body as described. Particles may be included in a feedstock in the form of a powder or as part of a slurry of the particles (in powder form) combined with other ingredients, such as one or more components of a binder composition.

Examples of useful particles include inorganic particles that are considered to be "sinterable," for example inorganic particles that may be formed into a green body as described and then processed by a sintering step that will cause the particles to become fused together. The particles may be of any sinterable material such as a metal or a ceramic material.

The particles can be of any size (e.g., mean particle size) or size range that is effective, including small or relatively small particles on a scale of microns (e.g., having an average size of less than 500 microns, less than 100 microns, less than 50 microns, 10 microns, or less than 5 microns). Preferably, a mean particle size of particles can be less than a thickness of a layer formed during an additive manufacturing technique as described.

The term "metal" as used herein refers to any metallic or metalloid chemical element or an alloy of two or more of these elements. Useful or preferred particles may be made of metals that include nickel, nickel alloy, and stainless steel, among others.

The particles can be selected to achieve effectiveness in processing as described, to be capable of being contained in a feedstock, formed into a feedstock layer, formed into solidified feedstock and a multi-layer composite, and then optionally further processed such as by sintering to form a porous sintered body that will have a desired utility, e.g., as a porous filter membrane. The size, shape, and chemical makeup of the particles can be any that are effective for these purposes.

Referring to the binder component of the methods, materials that may be useful as a binder or a component of a binder include materials that are polymeric, organic (e.g., liquid solvents), and inorganic.

Examples of inorganic materials that may be useful as a component of a binder include particles such as clays that can be suspended in a liquid and dried to form a solid material. A useful clay or other inorganic particle-type binder ingredient may be combined with inorganic particles (e.g., metal or ceramic, as described), solvent (water or organic solvent), and polymer in a manner by which the inorganic binder particles and the inorganic particles (of the feedstock) can become suspended together in a liquid (e.g., water, organic solvent, or a combination of both), with the polymer, followed by removal of the liquid, e.g., by evaporation. Upon evaporation of the liquid, the inorganic particles of the binder, and the polymer, form a solidified binder composition that supports the inorganic particles of the feedstock as part of a solidified feedstock composition.

Other binder compositions include curable polymeric binder materials. Curable polymeric binders may be combined as a liquid with particles formed into a feedstock layer, then solidified. Examples of curable polymeric binders include materials that are chemically curable, for example by reacting to solidify upon exposure to elevated temperature (thermosetting), or by reacting to solidify upon exposure to electromagnetic radiation such as from a laser, e.g., a UV laser. Other examples of polymeric binders may be applied as a liquid, within a liquid solvent, and the solvent may then be evaporated to leave the polymeric binder as a structure that supports the particles. A polymeric component of a binder may optionally be cured after the multi-layer composite is completely formed, i.e., after all layers of the multi-layer composite are formed, using a single curing that causes polymer contained in all of the layers of the multi-layer composite to cure by a chemical reaction that is initiated by heat (increased temperature), exposure to radiation, or by another reaction mechanism.

Curable liquid binder compositions may include curable materials that contain chemical monomers, oligomers, polymers, cross-linkers etc., and may additionally contain minor amounts of functional ingredients or additives that allow for or facilitate flow, solidification, or curing of a curable binder composition. These may include any of: a flow aid, a surfactant, an emulsifier, a dispersant to prevent particle agglomeration, and an initiator to initiate cure of the polymer when exposed to electromagnetic (e.g., ultraviolet) radiation or an elevated temperature.

In additive manufacturing techniques referred to as "powder-bed" techniques, which include various techniques referred to as "binder-jet printing" techniques, particles are contained in a bed of "feedstock" that can be formed into a uniform layer, known as a "feedstock layer." The feedstock layer contains the particles and may optionally include one or more additional ingredients, such as one or more components of a binder composition. Other optional ingredients may include flow aids or polymeric spacer particles. These methods include steps that allow or cause a binder composition, one or more components of which may be included in the feedstock layer or selectively applied to portions of the feedstock layer, to solidify to form a solidified binder composition at selected portions (areas) of the feedstock layer. The mechanism by which the binder composition (or separate portions thereof) becomes located at the selected portion of the feedstock layer, and the mechanism by which the binder composition at the selected portion of the feedstock layer becomes solidified, may vary.

Powder-bed additive manufacturing techniques can involve, in general terms, a sequence of multiple individual layer-forming steps, each step being used to form a single cross-sectional layer of a multi-layer composite. After forming a first (bottom) layer, each subsequent layer is formed on a top surface of a preceding layer. This series of multiple individual layer-forming steps is effective to form a multi-layer composite of multiple individually-formed layers of solidified feedstock. Powder-bed additive manufacturing techniques may be used as described to prepare a multi-layer composite that includes multiple layers of different thicknesses, including one or more fine layers and one or more coarse layers, to produce a composite that has a thickness that is within a pre-determined thickness tolerance relative to a thickness target.

These techniques, like other additive manufacturing techniques, produce three-dimensional bodies that are described or defined by digital data such as a CAD (computer-aided design) file. A three-dimensional body is sequentially built up, layer-by-layer, using a series of individual steps that combine to produce a composite body ("multi-layer composite") made of many thin cross sectional layers of solidified feedstock. Each layer-forming step may include forming on a surface a single feedstock layer that includes feedstock that contains particles. In some example methods, the feedstock layer may contain binder composition or a component thereof. In other example methods, a feedstock layer does not contain binder composition or a component of a binder composition; in these methods the binder composition is selectively added to portions of the feedstock layer.

By one example, a roller or other spreading device uniformly applies an amount of a feedstock composition in the form of a powder or slurry over a surface, either by applying a single amount of a feedstock composition in a single pass, or by applying multiple separate amounts of feedstock with multiple passes over the surface. The "feedstock layer" may be formed from a feedstock composition by one or multiple steps of applying a feedstock composition to the surface and using a roller or other application method to form a smooth, uniform feedstock layer having a desired and useful depth.

A useful depth of a feedstock layer can be a depth to form a coarse layer, or a depth to form a fine layer, as desired. A range of depths that may be formed by a particular process and system may depend on factors such as the composition of the feedstock, and the resolution of a printhead or other device used to apply a liquid material to the feedstock layer. As a single non-limiting example, a printhead having a resolution of 100 microns may be used with a feedstock layer having a depth of approximately 10 microns.

After forming a feedstock layer, portions of the feedstock layer are selectively processed to form solidified feedstock composition as part of a feedstock layer. Following these steps to form solidified feedstock composition, an additional thin layer of feedstock composition is spread over the top surface of the completed layer, which contains the solidified feedstock composition surrounded by an amount of non-solidified (original) feedstock composition.

The process is repeated to form multiple layers that contain solidified feedstock, with each new layer (after the first layer) of solidified feedstock composition being formed on and adhering to a previous layer of solidified feedstock composition. Multiple feedstock layers are deposited and multiple layers of solidified feedstock composition are formed, successively, one over each completed layer, to form the multi-layer composite. The layers may have different thicknesses. Each of the layers may be made of the same feedstock material, or different layers may be made of different feedstock materials. After all layers of the multi-layer composite have been deposited, the portions of the feedstock layers that contain the original feedstock material that has not been used to prepare solidified feedstock composition may be separated away from the multi-layer composite.

If desired or useful, a feedstock layer used in a powder bed additive manufacturing technique may contain one or more optional ingredients that are either part of a binder composition or otherwise useful as part of the solidified feedstock layer. These may include, for example, a flow aid to improve flow of the feedstock within the printer bed, to improve the ability of the feedstock to form an even (uniform, level, homogeneous) feedstock layer. Alternately or in addition, the feedstock layer may optionally contain solid polymer material that acts as a spacer between the particles, e.g., that acts as a "pore-forming" material. Such a solid polymer may be a thermoplastic (in solid form at room temperature) pore-forming polymer, and may be present in the feedstock layer in any desired amount, such as in an amount of from 0.5 to 15 weight percent based on total weight feedstock, e.g., from 1 to 12 or from 2 to 10 weight percent based on total weight feedstock, with the balance of the feedstock (by weight) being particles.

In more detail, one specific example of a powder-bed techniques is referred to as "jet binder printing." According to these exemplary additive manufacturing methods, the feedstock layer contains the particles and may or may not include binder composition or a component of a binder composition.

The solidified feedstock layer is formed by selectively applying a liquid material to portions of the feedstock layer to selectively form solidified feedstock composition at the portions of the feedstock layer. A printhead or other device that is effective to selectively dispense and apply a desired amount of the liquid to the feedstock layer moves over the upper surface of the feedstock layer. The printhead or other useful device ejects the liquid and applies the liquid at selected portions of the top surface of the feedstock layer. The liquid flows into the feedstock layer and is useful to form solidified binder composition at the locations of the feedstock layer at which the liquid is selectively applied. The solidified feedstock composition contains the particles dispersed throughout the solidified binder composition.

Within this general description of jet binder techniques, different variations also exist. According to one variation, the feedstock layer contains particles and a binder composition or portion of a binder composition, and the liquid that is selectively applied to the feedstock layer is a liquid that is useful in a step of causing the binder composition or component thereof in the feedstock layer to solidify.

With more exemplary detail, but without limiting the present description, this type of method may use feedstock that contains particles and a component of a binder composition that will become dissolved, suspended, or otherwise activated when contacted with the ejected liquid, after which the combined binder composition may become solidified as a matrix surrounding the particles.

The component of the binder composition that is included in the feedstock may be organic, such as a polymer (e.g., polyvinyl alcohol) or a phenolic resin, or may be inorganic, such as an inorganic particle such as clay. The liquid may be a liquid that is effective to dissolve, disperse, or chemically react with the binder composition that is initially present in the feedstock layer. In some examples, the liquid or a portion of the liquid may subsequently be removed (e.g., evaporated) to leave behind a solidified feedstock composition that includes solidified binder composition as a matrix structure that surrounds and supports the particles.

As a different variation of a powder-bed additive manufacturing technique, a feedstock layer does not contain (or does not require) any ingredient that is part of a binder composition. In this variation, the liquid that is selectively applied to the feedstock layer may include all necessary ingredients of a binder composition, which may be in the form of a chemically curable polymer in liquid form. In this variation, the liquid binder composition is selectively applied to the feedstock layer and is allowed or caused to solidify in place to produce the solidified feedstock layer.

According examples of this type of a system, the feedstock layer may contain particles and need not contain any other material. E.g., the feedstock layer may contain at least 70, 80, 90, or 95 percent by weight particles. Other ingredients may be desired, however, such as pore-forming particles, flow aids, and the like, as described herein.

The liquid binder composition that is applied to the feedstock layer can include all ingredients of a binder composition that are necessary to selectively dispense and apply the binder composition in liquid form to a feedstock layer, and also for the liquid binder composition to become solidified, optionally by further processing such evaporation or chemical reaction. The liquid binder may, for example, contain polymeric material that can be solidified by any of a chemical curing mechanism (by exposure to electromagnetic radiation) or by removal of solvent by evaporation.

Yet another variety of an additive manufacturing technique is referred to as stereolithography. This method uses steps and equipment similar to powder-bed techniques. By these techniques, the feedstock layer contains particles dispersed in a curable liquid binder composition. The feedstock layer can be contained in a shallow bed, as with binder jet techniques. Multiple layers of solidified feedstock composition are successively formed by each layer being selectively cured (solidified) by exposure to electromagnetic radiation such as ultraviolet (UV) radiation. Compared to selectively applying liquid to a powder feedstock layer to cause the feedstock layer to solidify (as described supra with respect to jet binder techniques), stereolithography techniques selectively solidify (cure) portions of a liquid feedstock layer by exposing those portions of the feedstock layer to electromagnetic radiation, which induces chemical curing.

Each of these different types of additive manufacturing techniques for use in preparing a multi-layer composite will require a binder composition, particles (e.g., in the form of a powder or collection of particles), and useful equipment for carrying out the additive manufacturing steps. The equipment may be an automated 3D printer that is capable of forming the multi-layer composite by a powder bed technique (generally), a jet binder printing technique, a stereolithographic printing technique, or another useful additive manufacturing method. Useful equipment and related methods will be effective to place multiple layers of solidified feedstock, sequentially, one over a preceding layer, to form the multi-layer composite.

Figure 3A:
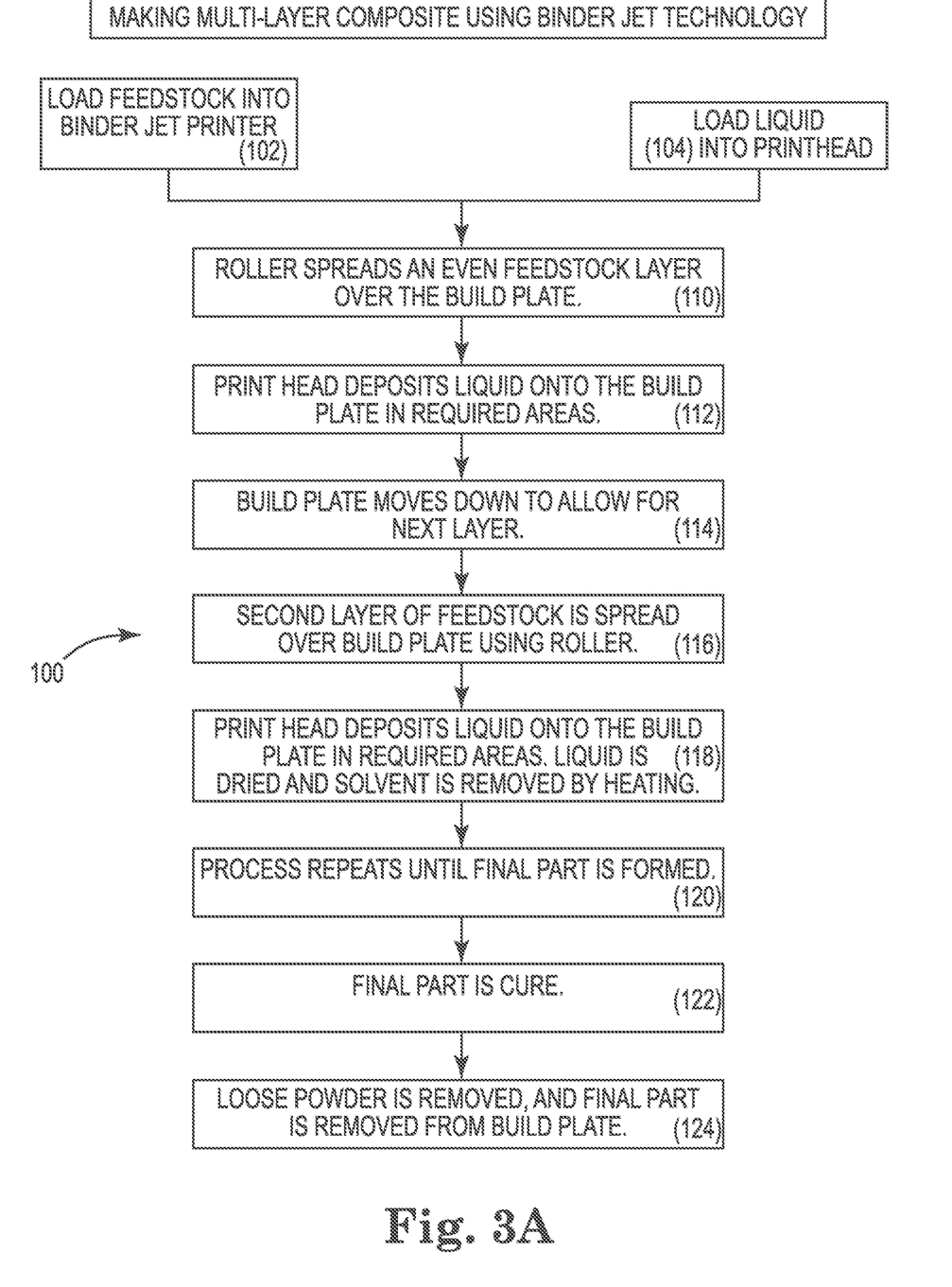
FIGS. 3A, 3B, 4A, and 4B shows example steps of methods as described of forming a multi-layer composite or a derivative body, as describes.
Figure 3B:
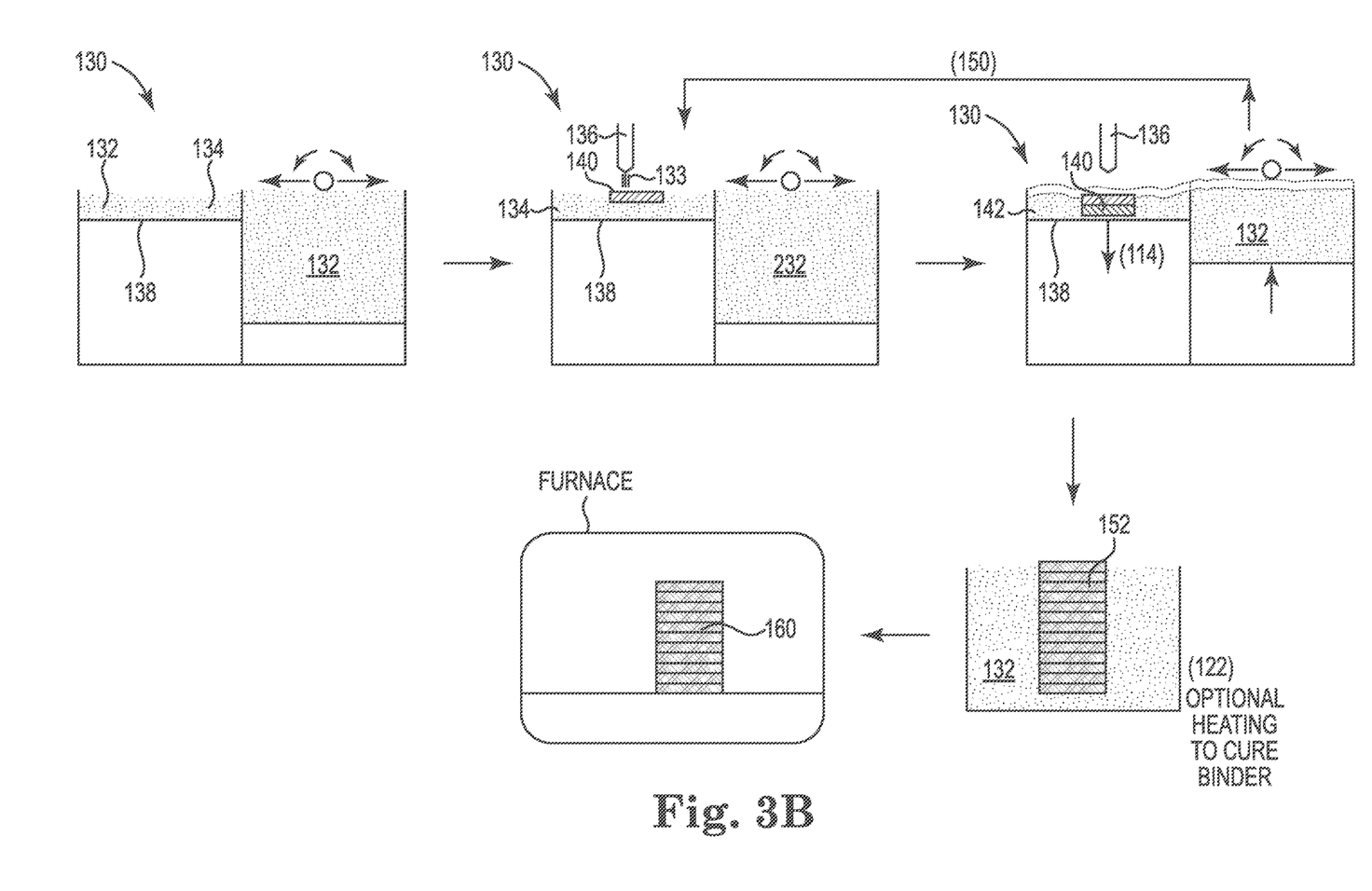

Examples of a binder jet printing additive manufacturing technique (100) useful for preparing a multi-layer composite are shown at FIGS. 3A and 3B.

FIG. 3A illustrates a sequence of steps of a useful binder jet printing additive manufacturing technique, and identifies that the method can be used, independently, with different forms of feedstock 102 loaded at a printer bed of an additive manufacturing system, and with different liquids 104 loaded at a printhead of the additive manufacturing system.

Feedstock 102 is a powder (or, alternately a slurry) that contains particles and optional additional ingredients. In example methods, feedstock 102 does not contain binder composition or a component thereof (e.g., does not require binder composition or a component thereof), and liquid 104 contains binder composition. In other example methods, feedstock 102 does contain binder composition or a component of binder composition, and liquid 104 contains a liquid ingredient that is effective to or assists in causing the binder composition in the feedstock to solidify, with optional processing such as evaporation or by causing chemical reaction of the binder. The process can be performed using commercially available binder jet printing apparatus, particles as described herein, and with liquid (heated thermoplastic) polymeric binder (104) dispensed from a printhead of the apparatus.

According to example steps of the method (FIG. 3A), feedstock (e.g., 102) is loaded into a bed of a powder-bed additive manufacturing system and is formed as an even feedstock layer of a desired depth, over a build plate of the apparatus (110). In a subsequent step (112), a print head selectively deposits liquid binder (104) onto a portion of the first layer. The liquid binder (104) may be solidified after being placed onto the feedstock layer. For example, liquid binder (104) may contain polymer that is dissolved or dispersed in a liquid solvent that can be removed to cause the polymer to solidify. After the liquid binder (104) is selectively applied to the feedstock layer, the liquid binder (104) can be solidified, e.g., by applying heat to the liquid binder to remove solvent from the binder and form solidified feedstock at the portion. Alternately, the liquid binder (104) may be a curable polymer that can be applied to the feedstock layer in liquid form and then reacted chemically to solidify.

The liquid binder is applied to the feedstock layer in an amount that is effective to fix the positions of the particles of the feedstock layer. The method does not require that the liquid binder be applied in an amount or manner to fill spaces between particles of the feedstock, but may be applied in an amount that connects or "bridges" adjacent or nearby particles in the feedstock layer to cause the positions of the particles to be fixed relative to other particles, without necessarily filling void spaces of the feedstock layer. The "solidified" feedstock is "solid" in a sense of being stiffened, rigid, or hardened sufficiently to act as a structure that supports and maintains the positions of the particles, but may also contain openings, void spaces, or pores between the connected particles. The solidified feedstock, for example, may include particles that are connected by a dried, cured, or otherwise continuous (but not necessarily solid, meaning without pores) polymeric material that connects and maintains the position of particles within the solidified feedstock structure.

Portions of the feedstock layer as applied, that are not formed to solidified feedstock, remain as the original powder feedstock.

The build plate is moved down (114) and a second layer of the feedstock is formed (116) as a second even feedstock layer over the first feedstock layer, which includes a portion of solidified feedstock. The print head then selectively deposits a second amount of the liquid polymeric binder (104) onto portions of the second feedstock layer (118), and the second amount of the liquid binder is solidified to form solidified feedstock from the second layer, e.g., by using heat to remove solvent and form dry (solidified) polymeric binder, or by another relevant mechanism based on the type of binder composition.

Portions of the second layer that are not formed to solidified feedstock remain as the original powder feedstock.

Steps 114, 116, and 118 are repeated (120) to form a completed multi-layer composite (e.g., green body) that is surrounded by the original feedstock (102 or 104). The multi-layer composite is a multi-layer body that contains the solidified feedstock of each formed layer, and is composed of the particles dispersed in the solidified (solid) binder. Optionally, the multi-layer composite, optionally in the presence of the surrounding original powder feedstock, can be heated to crosslink and cure the liquid polymeric binder (122), if the polymeric binder is thermocurable. The original (loose) powder feedstock (102 or 104) can be removed and separated from the multi-layer composite (124). According to the present description, any one or more layers of the feedstock may be a fine layer or a coarse layer.

The multi-layer composite can be moved to a location for any subsequent type of processing (post-processing) that may be useful or desired to convert the multi-layer composite (e.g., green body) to a derivative product such as a rigid inorganic body. Example steps, not illustrated, may include a debinding step to remove solidified binder from the multi-layer composite, and a sintering step to cause sintering of the particles of the multi-layer composite to connect the particles to form the rigid inorganic body.

FIG. 3B schematically illustrates steps of technique 100 with related process equipment and feedstock.

Referring to FIG. 3B, an example process can be performed using commercially available binder jet printing apparatus (130), feedstock (132) as described herein, and liquid (133) dispensed from a printhead (136) of the apparatus (130). According to example steps of the method, feed stock (132) is formed as an even thickness and level feedstock layer (134) over a build plate (138) of the apparatus (130). Feedstock layer (134) may be formed using a roller or other leveling device, using one pass or multiple passes to uniformly form and distribute a desired depth of feedstock (132). Feedstock layer (134) may be a fine layer or a coarse layer as described herein. Print head (136) selectively deposits liquid (133) onto a portion of the first layer (134).

Liquid 133 may be, for example, a liquid binder composition (as described relative to FIG. 3A) or may be another liquid as described herein. The liquid (133), in the form a liquid binder composition, is solidified, e.g., by drying with heat to evaporate solvent of the binder and form a first solidified feedstock (140) containing solid polymer at the portion, or by causing a chemical reaction to solidify the feedstock.

Portions of feedstock layer 134 that are not formed to solidified feedstock (140) remain as the original feedstock (132). The build plate (138) is moved down (114) and a second or subsequent feedstock layer (142) is formed over the first layer (134) and the first solidified feedstock (140). The print head (136) then selectively deposits a second amount of the liquid polymeric binder (133) onto portions of the second layer (142) and the second amount of the liquid polymeric binder (133) is solidified to form solidified feedstock from the second layer. Portions of the second layer that are not formed to solidified feedstock remain as the original feedstock. Feedstock layer (142) may be a fine layer or a coarse layer as described herein.

This sequence of steps of applying a feedstock layer over a previous layer, and applying binder to the new feedstock layer to produce solidified feedstock of the new feedstock layer, is repeated (150) to form a completed multi-layer composite (152) surrounded by the original powder feedstock (132). The multi-layer composite (152) is a body that contains the solidified feedstock of each formed layer, and is composed of the particles from the feedstock dispersed in the solidified (solid) polymer binder. The composite (152) has been formed to include layers of different thicknesses, including one or more fine layers and one or more coarse layers. As desired, the multi-layer composite can be further processed to produce a derivative product, such as by converting a multi-layer composite in the form of a green body into a rigid organic body (e.g., a porous sintered metal membrane) by post-processing that includes debinding and sintering.

For example, as illustrated, the multi-layer composite (152), optionally in the presence of the surrounding original powder feedstock (132), can be heated to cure the liquid polymeric binder (122).

The original (loose) powder feedstock (132) can be removed and separated from the multi-layer composite (152). The multi-layer composite (152) can be moved to an oven for heating to a temperature that will be effective to remove solidified binder (debind) from the multi-layer composite (152). As desired, the multi-layer composite (152), following the debind step, may be still further processed by a sintering step in a furnace to form a derivative structure, such as rigid inorganic body (160).

The technique referred to as stereolithography (SLA) is a version of additive manufacturing technology that can be used to form a multi-layer composite in a layer-by-layer fashion, that involves photochemical processes by which light (electromagnetic radiation) is used to selectively cause reactive chemical ingredients such as monomers, oligomers, crosslinkers, etc., (together referred to as "polymer" or "liquid polymer binder") of a layer of liquid feedstock to polymerize, cross-link, or otherwise react chemically to form a cured polymeric reaction product ("solidified polymer") of solidified feedstock of a feedstock layer. The liquid polymer binder is selectively curable by exposure to electromagnetic radiation such as ultraviolet (UV) light. The feedstock is in liquid form and contains curable liquid polymer ("liquid polymer binder") in combination with particles.

The multi-layer composite is built by sequential steps of producing many thin cross sections ("solidified feedstock" of a "layer," herein) of a larger three-dimensional structure (composite). A source of electromagnetic radiation (e.g., a laser) selectively applies electromagnetic radiation over a portion of a layer of the liquid feedstock, which according to the present description contains particles and liquid polymer binder that can be solidified by chemically curing upon exposure to the electromagnetic radiation. Electromagnetic radiation, e.g., supplied by a laser, selectively irradiates a portion of the layer of the liquid feedstock at a surface of the layer. The electromagnetic radiation causes the liquid polymer binder to solidify by a chemical reaction (i.e., to cure) to form solidified feedstock that contains the particles and solidified (cured) polymer.

After an initial layer of solidified feedstock is formed, an additional thin layer of the liquid feedstock is deposited over the top surface of the completed layer that contains the solidified feedstock and the process is repeated to form multiple layers, each on top of and adhering to a top surface of a previous layer. Multiple layers are deposited, successively, one over each completed layer, to form a multi-layer composite that is a composite of each layer of solidified feedstock. The multiple layers can include one or more fine layers and one or more coarse layers as described herein. After all layers of the multi-layer composite have been formed, portions of the layers that contain original liquid feedstock that has not been used to prepare solidified feedstock are separated from the multi-layer composite. The multi-layer composite can be subsequently processed as desired to form a derivative structure such as a rigid inorganic body (e.g., a porous sintered metal membrane), e.g., by steps that include removing the solidified (cured) polymer from the particles (i.e., "debinding") and optional sintering.

Stereolithographic additive manufacturing techniques may be used as described to prepare a multi-layer composite that includes multiple layers of different thicknesses, including one or more fine layers and one or more coarse layers, to produce a composite that has a thickness that is within a pre-determined thickness tolerance relative to a thickness target.

Figure 4A:
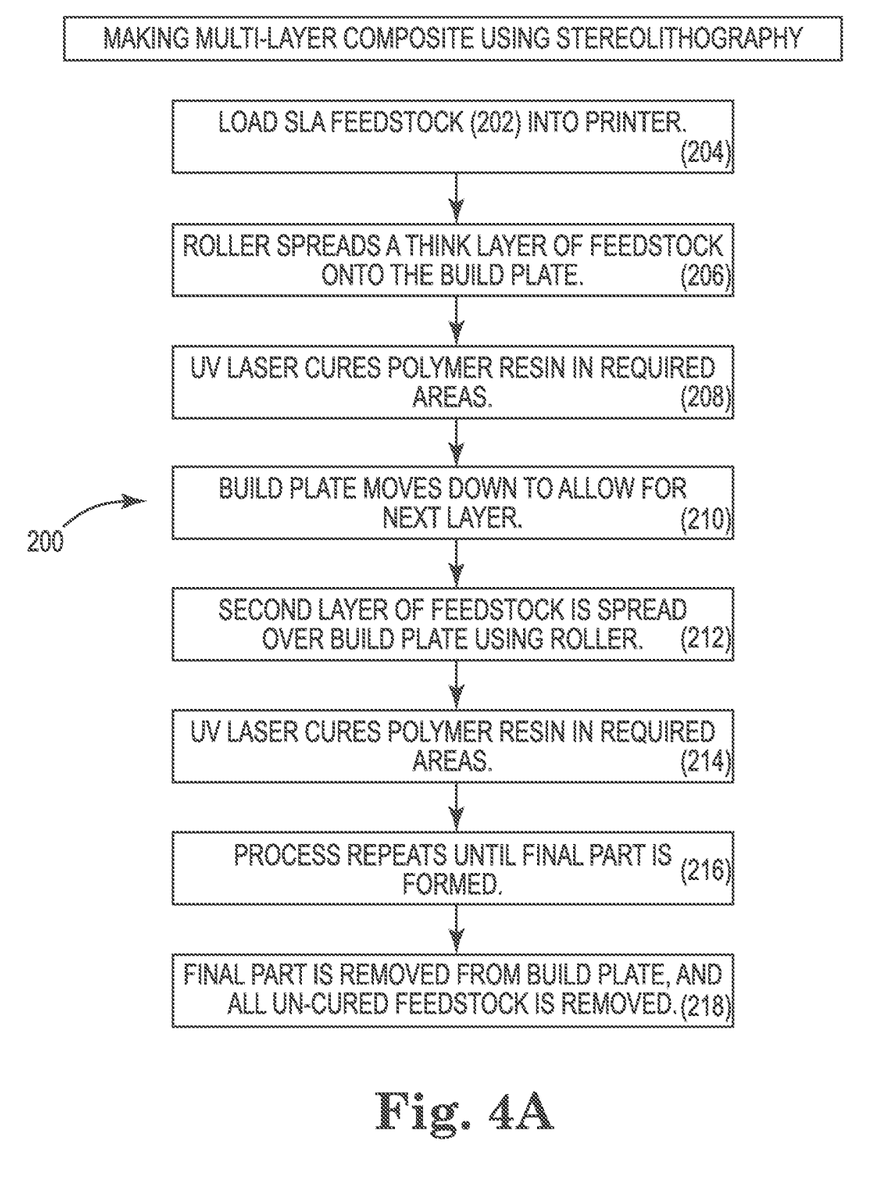

An example of a stereolithography additive manufacturing technique (200) useful for preparing a multi-layer composite as described, is shown at FIG. 4A. Feedstock 202 is a liquid that contains particles in combination with a liquid curable polymer binder.

The process can be performed using commercially available stereolithography additive manufacturing equipment and liquid polymeric binder combined with the particles to form feedstock. According to example steps of the example method (as shown at FIG. 4A, with steps numbered parenthetically), liquid feedstock (202) contained by a stereolithographic additive manufacturing apparatus is formed as an even layer over a build plate of the apparatus (204, 206). In a subsequent step (208), a source of electromagnetic radiation (e.g., a UV (ultraviolet) laser) selectively irradiates a portion of this first layer with radiation of a wavelength that will chemically cure and solidify the liquid polymer binder of the feedstock. The solidified liquid polymer binder forms solidified feedstock at the irradiated portion. The layer of liquid feedstock may be a fine layer or a coarse layer.

Portions of the layer that are not formed to solidified feedstock remain as the original liquid feedstock.

The build plate is moved down (210) and a second layer (either a fine layer or a coarse layer) of the liquid feedstock is formed (212) as a second even layer over the first feedstock layer and over the solidified feedstock of the first feedstock layer. The source of electromagnetic radiation then selectively irradiates a portion of the second layer (214) to solidify (cure) a portion of the second layer of liquid feedstock to form solidified feedstock at portions of the second layer. Portions of the second layer that are not formed to solidified feedstock remain as the original liquid feedstock. Steps 212, 214, and 216 are repeated (218) to form a completed multi-layer solidified feedstock composite ("final part") surrounded by the original liquid feedstock (202).

The multi-layer solidified feedstock composite is a body that contains the solidified feedstock of each formed layer, and is composed of the particles dispersed in the solidified (solid) polymer binder of the liquid feedstock. The original liquid feedstock (202) can be removed and separated from the multi-layer composite (218). The multi-layer composite can then be further processed to form a derivative structure, such as a rigid inorganic body.

Figure 4B:
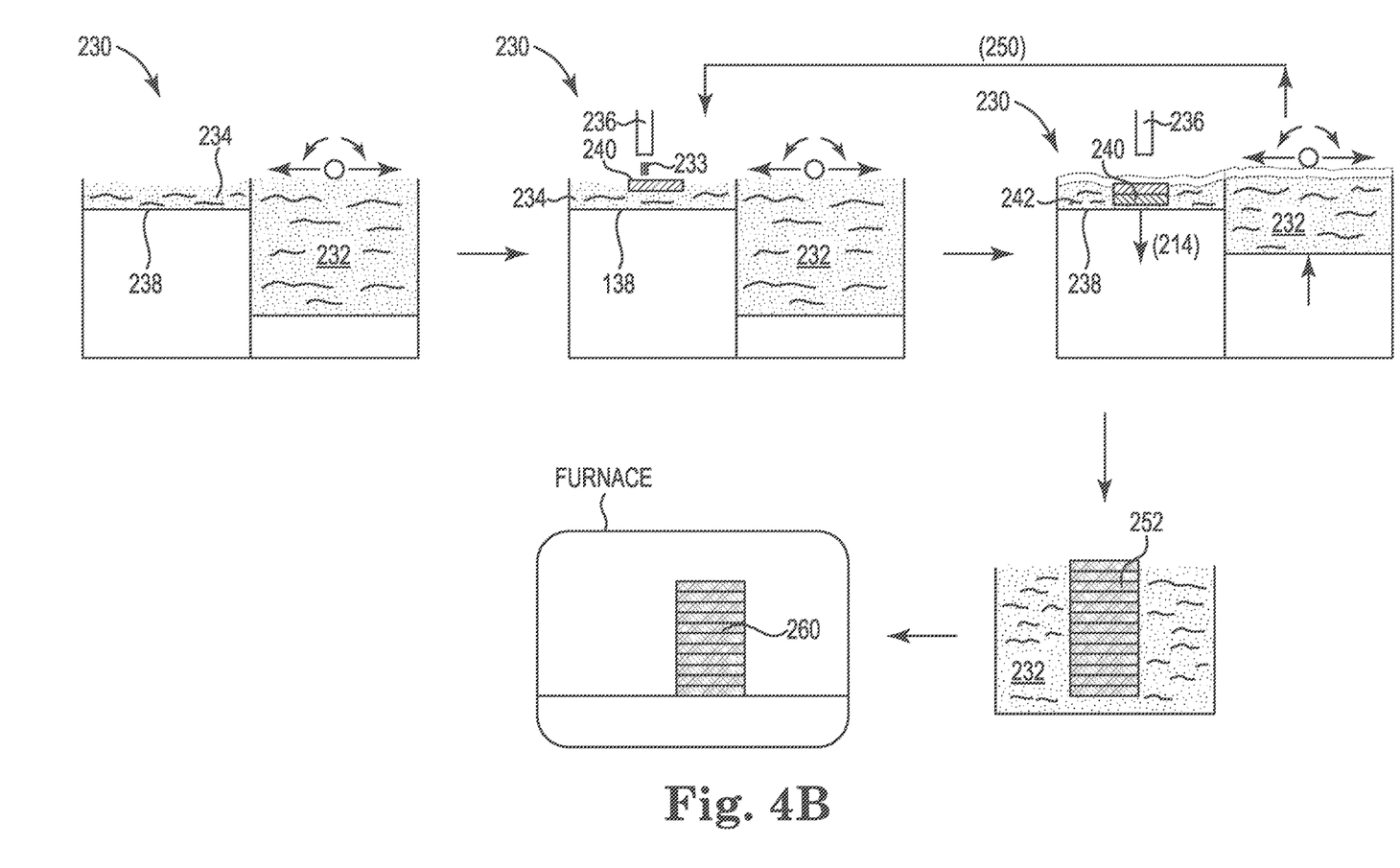

Referring to FIG. 4B, an example process can be performed using commercially available stereolithographic additive manufacturing apparatus (230), and using liquid feedstock (232) according to the present description. According to example steps of the method, liquid feedstock (232) is formed as an even feedstock layer (234) over a build plate (238) of the apparatus (230). Laser (236) applies electromagnetic radiation (233) to a portion of the first layer (234) to form first solidified feedstock (240) at the portion. Portions of feedstock layer (234) that are not formed to solidified feedstock (240) remain as the original liquid feedstock (232). The build plate (238) is moved down (214) and a second or subsequent liquid feedstock layer (242) is formed over the first layer (234) and the first solidified feedstock (240). The laser (236) then selectively applies electromagnetic radiation (233) to portions of the second layer (242) to form solidified feedstock from the second layer. Portions of the second layer that are not formed to solidified feedstock remain as the original liquid feedstock. The sequence is repeated (250) to form a completed multi-layer solidified feedstock composite (252) surrounded by the original liquid feedstock (232). The multi-layer solidified feedstock composite (252) is a body that contains the solidified feedstock of each formed layer, and is composed of the particles from the feedstock dispersed in solidified (solid) cured polymer of the feedstock.

The original liquid feedstock (232) can be removed and separated from the multi-layer composite (252). The multi-layer composite (252) can then be further processed by a sintering step in a furnace to form a derivative structure, such as rigid inorganic body (260)

Aspects

In a first aspect, a method of forming a three-dimensional body by additive manufacturing steps comprises: forming a coarse feedstock layer having a coarse feedstock layer thickness, solidifying a portion of the coarse feedstock layer to form a solidified coarse feedstock layer having a solidified coarse feedstock layer thickness, before or after forming the solidified coarse feedstock layer, forming a fine feedstock layer having a fine feedstock layer thickness that is less than the coarse feedstock layer thickness, and solidifying a portion of the fine feedstock layer to form a solidified fine feedstock layer having a solidified fine feedstock layer thickness that is less than the solidified coarse feedstock layer thickness.

A second aspect according to the first aspect, wherein: forming the solidified coarse feedstock layer comprises: forming the coarse feedstock layer, applying liquid to the portion of the coarse feedstock layer, and solidifying the portion of the coarse feedstock layer to form the solidified coarse feedstock layer; and forming the solidified fine feedstock layer comprises: forming the fine feedstock layer, applying liquid to the portion of the fine feedstock layer, and solidifying the portion of the fine feedstock layer to form the solidified fine feedstock layer.

A third aspect according to the first aspect, wherein: forming the solidified coarse feedstock layer comprises: forming the coarse feedstock layer, and solidifying the portion of the coarse feedstock layer by irradiating the portion of the coarse feedstock layer, to form the solidified coarse feedstock layer; and forming the solidified fine feedstock layer comprises: forming the fine feedstock layer, and solidifying the portion of the fine feedstock layer by irradiating the portion of the fine feedstock layer, to form the solidified coarse feedstock layer.

A fourth aspect according to any of the preceding aspects, wherein the solidified fine feedstock layer forms at least a portion of an exterior of the three-dimensional body.

A fifth aspect according to the fourth aspect, wherein the solidified fine feedstock layer forms a top surface of the exterior of the three-dimensional body.

A sixth aspect according to the fifth aspect, wherein the solidified fine feedstock layer forms a top surface and a bottom surface of the exterior of the three-dimensional body.

A seventh aspect according to any of the fourth through sixth aspects, wherein the solidified fine feedstock layer forms at least a portion of a side surface of the exterior of the three-dimensional body.

An eighth aspect according to any of the fourth through seventh aspects, wherein the solidified feedstock layer forms the entire exterior of the three-dimensional body.

A ninth aspect according to any preceding aspect, wherein the solidified fine feedstock layer thickness is not more than 70 percent of the solidified coarse feedstock layer thickness.

A tenth aspect according to any preceding aspect, wherein the fine feedstock layer comprises sinterable metal particles or sinterable ceramic particles, and the coarse feedstock layer comprises sinterable metal particles or sinterable ceramic particles.

An eleventh aspect according to any preceding aspect, further comprising: designating a target thickness and a thickness tolerance for the body, forming multiple solidified coarse layers, each having a thickness that is greater than the magnitude of the thickness tolerance, forming at least one solidified fine layer that has a thickness that is less than the magnitude of the thickness tolerance, and forming the three-dimensional body to have a measured thickness that differs from the target thickness by not more than the magnitude of thickness tolerance.

A twelfth aspect according to the sixth aspect, wherein the target thickness is in a range from 1 to 5 millimeters, the thickness tolerance is +/−0.08 mm or less, and the measured thickness is not more than the magnitude of the thickness tolerance more than or less than the target thickness.

A thirteenth aspect according to the twelfth aspect, wherein the thickness tolerance is less than +/−50 microns, and the method comprises: forming multiple solidified coarse layers that each have a thickness of at least 50 microns, and forming at least one solidified fine layer that has a thickness of less than 80 microns.

A fourteenth aspect according to any preceding aspect, wherein feedstock for the coarse feedstock layer or fine feedstock layer comprises metal particles and binder composition or a component of a binder composition.

A fifteenth aspect according to the fourteenth aspect, wherein liquid in the coarse feedstock layer of fine feedstock layer comprises one water, organic solvent, or both.

A sixteenth aspect according to any of the first through thirteenth aspects, wherein: feedstock for the coarse feedstock layer or the fine feedstock layer comprises metal particles, and liquid in the coarse feedstock layer or fine feedstock layer comprises polymer of a binder composition.

A seventeenth aspect according to the sixteenth aspect, wherein the binder composition comprises a curable polymer, and the method comprises: selectively applying the liquid binder composition to the portions of the feedstock layers, and causing the liquid binder composition to cure by a chemical reaction.

An eighteenth aspect according to any preceding aspect, further comprising: separating the portions of solidified coarse feedstock layer and fine feedstock layer from portions of the coarse feedstock layer and fine feedstock layer that is not solidified, and sintering the solidified coarse feedstock layer and fine feedstock layer to form a solidified three-dimensional inorganic body.

A nineteenth aspect according to the eighteenth aspect, wherein the solidified coarse feedstock layer and fine feedstock layer comprises inorganic particles, and sintering the solidified coarse feedstock layer and fine feedstock layer causes the inorganic particles to form a sintered membrane.

A twentieth aspect according to the nineteenth aspect further comprising: designating a target thickness of the membrane and a thickness tolerance of the membrane, forming multiple solidified coarse feedstock layers, forming at least one solidified fine feedstock layer, and separating portions of solidified coarse feedstock layer and fine feedstock layer from portions of the coarse feedstock layer and fine feedstock layer that is not solidified, and sintering the solidified coarse feedstock layer and fine feedstock layer to form the sintered membrane, wherein the sintered membrane has a thickness that differs from the membrane target thickness by not more than the thickness tolerance of the membrane.

In a twenty-first aspect a sintered membrane is formed according to the method of twentieth aspect.

A twenty-second aspect according to the twenty-first aspect, wherein the membrane is a porous metal membrane.

In a twenty-third aspect, a three-dimensional body is formed according to a method of any of the first through nineteenth aspects.

The invention claimed is:

1. A method of forming a three-dimensional body by additive manufacturing steps, the method comprising:
designating a target thickness and a thickness tolerance for the three-dimensional body;
forming multiple solidified coarse feedstock layers, each having a thickness that is greater than a magnitude of the thickness tolerance;
forming at least one solidified fine feedstock layer that has a thickness that is less than the magnitude of the thickness tolerance; and
forming the three-dimensional body from the multiple solidified coarse feedstock layers and the at least one solidified fine feedstock layer,
wherein the three-dimensional body has a measured thickness that differs from the target thickness by not more than the magnitude of thickness tolerance,
wherein forming each solidified coarse feedstock layer and at least one solidified fine feedstock layer comprises:
forming a coarse feedstock layer having a coarse feedstock layer thickness,
solidifying a portion of the coarse feedstock layer to form a solidified coarse feedstock layer having a solidified coarse feedstock layer thickness,
before or after forming the solidified coarse feedstock layer, forming at least one fine feedstock layer having a fine feedstock layer thickness that is less than the coarse feedstock layer thickness, and
solidifying a portion of the at least one fine feedstock layer to form the at least one solidified fine feedstock layer having a solidified fine feedstock layer thickness that is less than the solidified coarse feedstock layer thickness.

2. The method of claim 1, wherein:
forming the solidified coarse feedstock layer comprises:
forming the coarse feedstock layer,
applying liquid to the portion of the coarse feedstock layer, and
solidifying the portion of the coarse feedstock layer to form the solidified coarse feedstock layer; and
forming the at least one solidified fine feedstock layer comprises:
forming a fine feedstock layer,
applying liquid to the portion of the fine feedstock layer, and
solidifying the portion of the fine feedstock layer to form the at least one solidified fine feedstock layer.

3. The method of claim 1, wherein:
forming the solidified coarse feedstock layer comprises:
forming the coarse feedstock layer, and
solidifying the portion of the coarse feedstock layer by irradiating the portion of the coarse feedstock layer, to form the solidified coarse feedstock layer; and
forming the at least one solidified fine feedstock layer comprises:
forming a fine feedstock layer, and
solidifying the portion of the fine feedstock layer by irradiating the portion of the fine feedstock layer, to form the solidified coarse feedstock layer.

4. The method of claim 1, wherein the at least one solidified fine feedstock layer forms at least a portion of an exterior of the three-dimensional body.

5. The method of claim 4, wherein the at least one solidified fine feedstock layer forms a top surface of the exterior of the three-dimensional body.

6. The method of claim 4, wherein the at least one solidified fine feedstock layer forms at least a portion of a side surface of the exterior of the three-dimensional body.

7. The method of claim 4, wherein the at least one solidified fine feedstock layer forms the entire exterior of the three-dimensional body.

8. The method of claim 1, wherein a thickness of the at least one solidified fine feedstock layer is not more than 70 percent of the solidified coarse feedstock layer thickness.

9. The method of claim 1, wherein the at least one fine feedstock layer comprises sinterable metal particles or sinterable ceramic particles, and the coarse feedstock layer comprises sinterable metal particles or sinterable ceramic particles.

10. The method of claim 1, wherein:
the target thickness is in a range from 1 to 5 millimeters,
the thickness tolerance is +/−0.08 mm or less, and
the measured thickness is not more than the magnitude of the thickness tolerance more than or less than the target thickness.

11. The method of claim 1, wherein feedstock for the coarse feedstock layer or fine feedstock layer comprises metal particles and binder composition or a component of a binder composition.

12. The method of claim 11, wherein the feedstock for the coarse feedstock layer or fine feedstock layer comprises a liquid, and wherein the liquid comprises one of water, organic solvent, or both.

13. The method of claim 1, wherein:
feedstock for the coarse feedstock layer or the at least one fine feedstock layer comprises metal particles and a binder composition, the binder composition comprising a liquid, and
wherein the liquid comprises a polymer.

14. The method of claim 13, wherein the polymer of the binder composition comprises a curable polymer, and the method comprises:

selectively applying the binder composition to portions of the feedstock layers, and causing the binder composition to cure by a chemical reaction.

15. The method of claim 1, further comprising:

separating portions of the multiple solidified coarse feedstock layers and the at least one solidified fine feedstock layer from portions of the coarse feedstock layers and fine feedstock layer that are not solidified, and sintering the solidified coarse feedstock layer and fine feedstock layer to form the three-dimensional body, wherein the three-dimensional body is a solidified three-dimensional inorganic body.

16. The method of claim 15, wherein the multiple solidified coarse feedstock layers and the at least one solidified fine feedstock layer comprises inorganic particles, and sintering the multiple solidified coarse feedstock layers and the at least one fine feedstock layer causes the inorganic particles to form the three-dimensional body, wherein the three-dimensional body is a sintered membrane.

17. The method of claim 16, wherein after forming the multiple solidified coarse feedstock layers and the at least one solidified fine feedstock layer, further comprising:

separating portions of the multiple solidified coarse feedstock layers and the at least one solidified fine feedstock layer from portions of the multiple solidified coarse feedstock layers and the at least one fine feedstock layer that are not solidified, and sintering the multiple solidified coarse feedstock layers and the at least one solidified fine feedstock layer to form the sintered membrane.

18. A sintered membrane formed according to the method of claim 17.

19. A three-dimensional body formed according to the method of claim 1.

* * * * *